(12) United States Patent
Foster

(10) Patent No.: US 6,443,626 B1
(45) Date of Patent: Sep. 3, 2002

(54) OPTICAL FIBRE CONNECTOR HAVING BAYONET COUPLING

(75) Inventor: Nigel Stewart Foster, Southampton (GB)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/544,534

(22) Filed: Apr. 6, 2000

(30) Foreign Application Priority Data

Apr. 9, 1999 (GB) .............................................. 9908184

(51) Int. Cl.[7] .................................................. G02B 6/38
(52) U.S. Cl. ............................................ 385/56; 385/66
(58) Field of Search .............................. 385/25, 52, 54, 385/55, 56, 58, 59, 60, 66, 73, 74; 439/286, 284, 289, 290

(56) References Cited

U.S. PATENT DOCUMENTS 4,448,478 A * 5/1984 Matthew et al. .............. 385/59
5,118,303 A * 6/1992 LeBaron et al. ............. 439/286

FOREIGN PATENT DOCUMENTS

EP 0 166 636 A1 5/1984
GB 2 022 284 A 5/1979

* cited by examiner

Primary Examiner—Cassandra Spyrou
Assistant Examiner—Euncha Cherry
(74) Attorney, Agent, or Firm—Robert C. Turner

(57) ABSTRACT

An optical fiber connector element comprises a connector body (10) which receives an optical fiber (12). The connector body (10) is provided with a bayonet coupling (30) to enable two identical connector elements to be mated to connect optically the optical fibers. The bayonet coupling (30) has two diametrically opposed connection arms (50,52), the arms of one connector fitting in the spacing between the arms of another connector to enable a bayonet connection to be established. An alignment feature (60) is positioned such that when the alignment feature (60) of the one connector and of the other connector are aligned, the arms (50,52) of the one connector are inserted into the spaces (54) between the arms of the other connector with the correct relative positioning to enable the bayonet fitting to be established. This facilitates the assembly of the coupling, which may be required in darkness and in adverse weather conditions when gloves are required.

7 Claims, 2 Drawing Sheets

Figure 1:
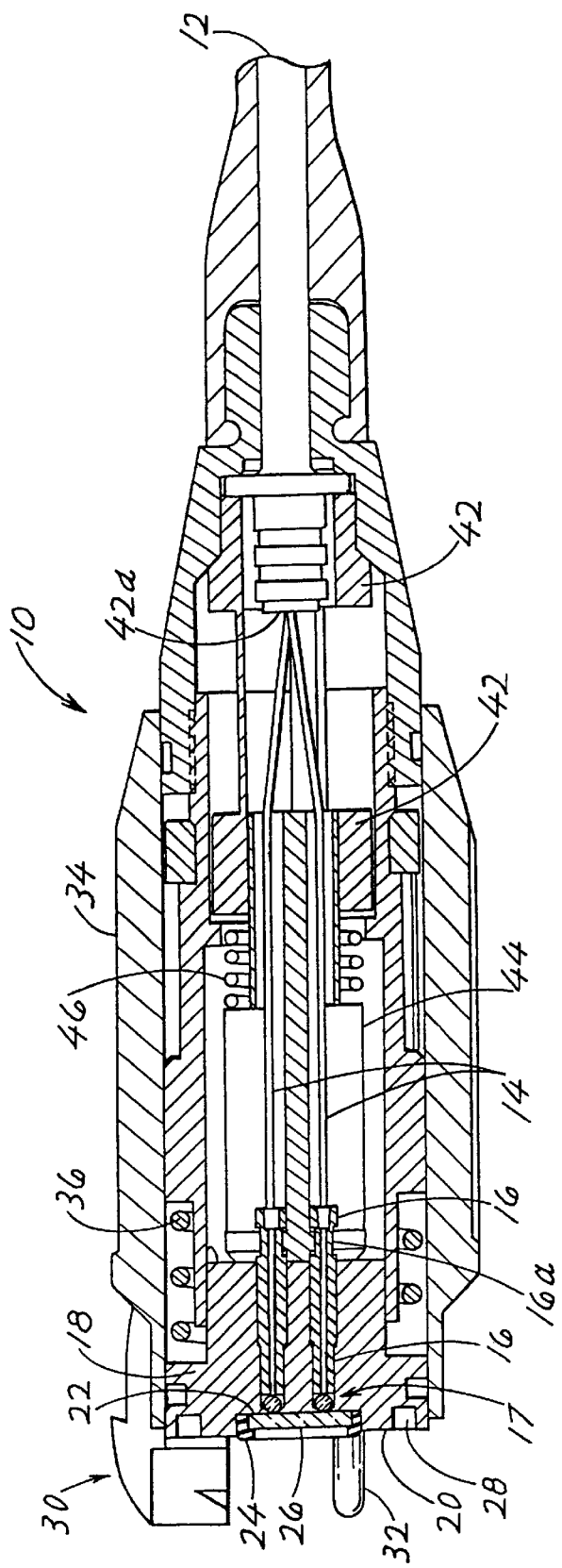

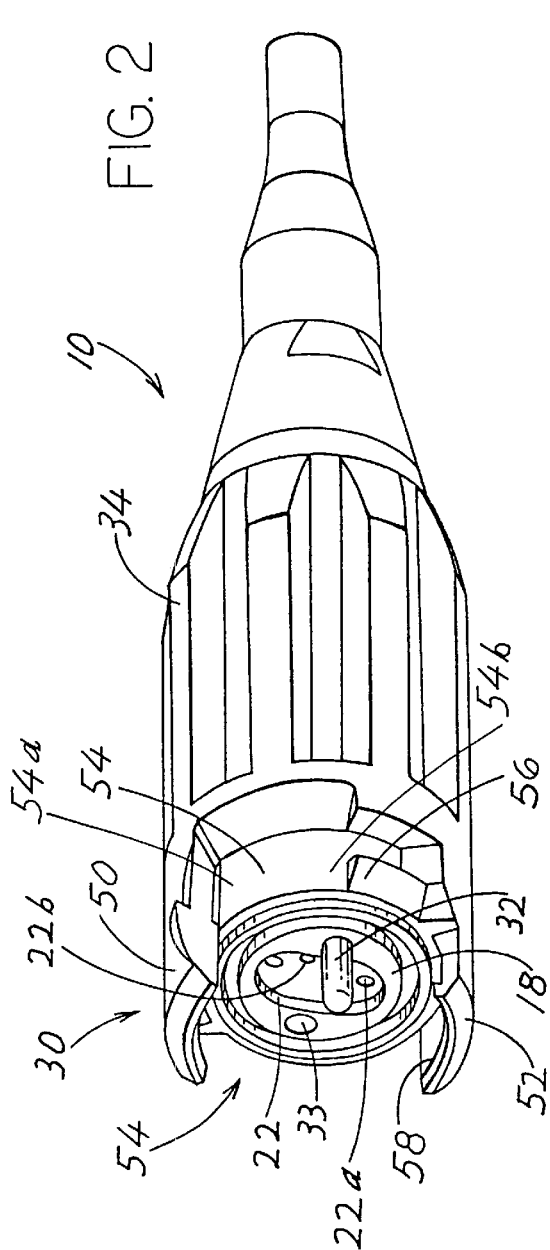
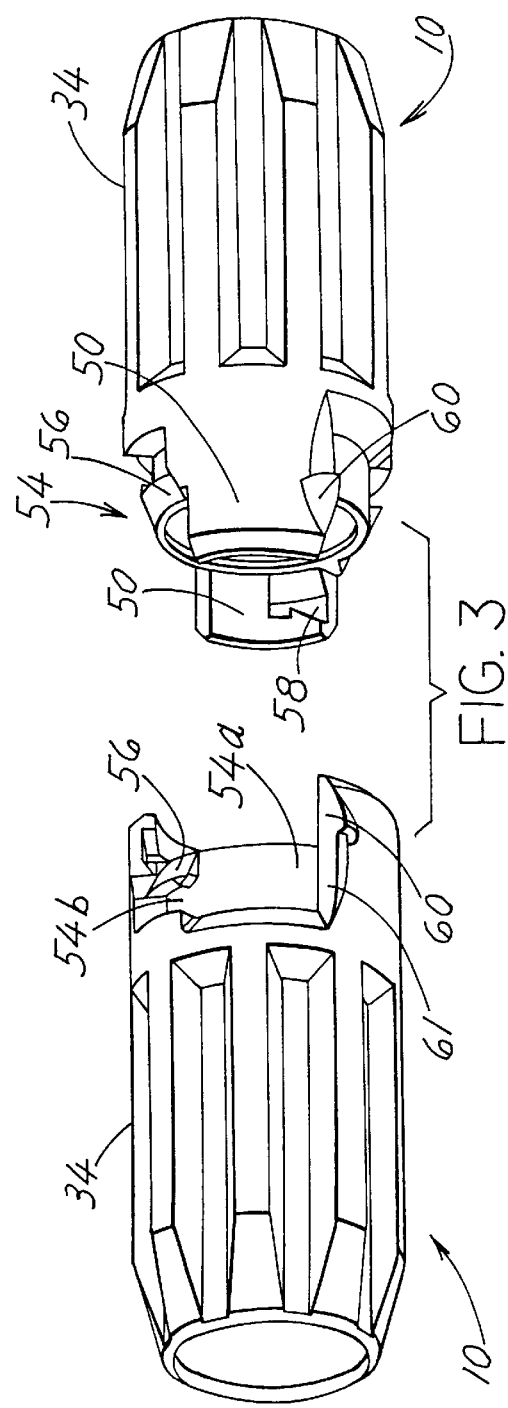

OPTICAL FIBRE CONNECTOR HAVING BAYONET COUPLING

BACKGROUND OF THE INVENTION

This invention relates to an optical fiber connector arrangement. In particular, the invention relates to optical fiber connectors having hermaphroditic bayonet couplings. These couplings have two diametrically opposed connection arms, the arms of one connector fitting in the spacing between the arms of another identical connector to enable the two connectors to be coupled together. Relative rotation between one connector and other identical connector then enables a bayonet connection to be established.

There are two possible orientations in which it can be attempted to couple the connectors, and only one orientation is correct (unless there is only one fiber located centrally in the connector). However, connectors of this type may be located in areas with adverse weather or light conditions, so that it may be difficult to obtain the correct alignment. For example, it may be dark and the operator may be wearing thickly padded gloves, so that it is difficult to see or feel the correct alignment required to form the coupling.

SUMMARY OF THE INVENTION

According to the invention, there is provided an optical fiber connector element comprising a connector body which receives an optical fiber, the connector body being provided with coupling means to enable two connector elements having identical coupling means to be mated to connect optically the optical fibers. The coupling means comprising bayonet couplings having two diametrically opposed connection arms, the arms of one connector fitting in the spacing between the arms of another connector having an identical coupling means, relative rotation between the one connector and the other connector then enabling a bayonet connection to be established. The connector body is provided with an alignment feature, positioned such that when the alignment feature of the one connector and of the other connector are aligned, the arms of the one connector are inserted into the spaces between the arms of the other connector with the correct relative positioning to enable the bayonet fitting to be established.

This facilitates the assembly of the coupling. The alignment feature is preferably provided along one edge of one of the arms, so that the alignment feature may easily be located by feel, since one edge of one of the arms will feel different to the other edges.

The alignment feature is preferably provided at one angular end of one arm, and an engagement part of the arm is provided at the other angular end of the arm. Thus, the alignment features are aligned during initial coupling, and become separated during subsequent rotational movement between the two arms to finish the coupling. The alignment feature preferably comprises a raised portion.

The optical fiber in the connector element preferably terminates with a ferrule, the connector body having an end face which is provided with a transparent window, the ferrule being positioned internally adjacent the window. The end face may then be provided with an opening and a projection, such that the connector can only be coupled to another identical connector with one relative orientation in which the projection of one connector enters the opening of the other connector.

An embodiment of the present invention will now be described by way of example with reference to the accompanying drawings, in which:

FIG. 1 sectional view of a connector element according to the invention;

FIG. 2 shows greater detail the coupling mechanism which enables two identical connector elements to be coupled together; and FIG. 3 shows in greater detail the bayonet coupling.

DESCRIPTION OF THE PREFERRED EMBODIMENT

FIG. 1 shows a sectional view of a connector element 10, which is designed for connection to another identical connector element, so that optical signals may be transmitted along adjacent optical fiber sections.

The connector element 10 receives at one end a sheathed optical fiber cable 12, and the individual optical fibers 14 are separated out within the connector element 10. Each of the individual optical fibers 14 is terminated with a ferrule 16 at the cut end. The ferrules 16 butt against an expanded beam lens arrangement 17 which enables the optical signals to bridge the gap between coupled connector elements. The ferrules 16 are accurately located within an end block 18 which defines an end face 20 of the connector element 10. The end block 18 is provided with a recess 22 which receives an insert assembly 24 having a window 26. The window 26 provides a surface which is perpendicular to the longitudinal axis of the connector element 10 against which the lens assembly 17 is positioned. The window 26 is sealed into the insert assembly 24 so that the window provides protection for the lens assemblies 17 and provides an easily cleanable surface. The end block 18 is provided with a second annular recess 28 in which an O-ring seal (not shown in FIG. 1) is located.

To enable two identical connector elements 10 to be coupled together, a hermaphroditic bayonet fitting is provided, which is indicated generally at 30. A more detailed description of the bayonet coupling is described further below.

When two such connector elements are coupled together by the bayonet fittings 30, the O-ring seals located in the recesses 28 butt against each other to provide a seal for protecting the windows 26 of the two connectors 10. The end block 18 is provided with an alignment pin 32 and a recess (not shown), so that when two connectors 10 are coupled together, the alignment pin 32 of one enters the recess of the other, and vice versa. In this way, accurate alignment of the ferrules between coupled connectors can be achieved.

As described above, the coupling arrangement is a bayonet fitting. As a result, at an intermediate stage of the coupling of two connector elements, the two connector elements are brought closer together than in the final connected state. To ensure that the end faces 20 are mated together when two connector elements 10 are coupled together, the end blocks 18 are arranged to be depressible into the main body 34 of the connector element 10. Thus, during the engagement of the bayonet fitting, the end blocks 18 become depressed into the body of the connector element, but once the latching engagement of the bayonet has been achieved, the end blocks 18 are biased to press against each other. For this purpose, a first spring 36 is provided which biases the end block 18 towards the end of the connector element 10. The end block is prevented from detaching from the main body 34 of the connector element by any suitable means, such as a pin and slot arrangement enabling limited sliding movement of the end block relatively to the remainder of the connector body.

Before engagement of the bayonet fitting, the pins 32 and recesses have been coupled, so that relative rotation of the two end blocks 18 is not possible. Therefore, the end blocks 18 are rotatably housed within the main body 34 so that the bayonet coupling may be achieved with the end blocks rotationally stationary with respect to each other.

When the end block 18 is depressed during coupling of the bayonet fitting, the optical fibers 14 will bow slightly, and the overall length of the connector element 10 is selected to accommodate this slight bowing of the optical fibers 14.

The exposed individual optical fibers are housed in a ferrule carrier, which for the purposes of this description is taken to comprise a first component 42 which grips the sheathed end of the optical fiber cable and a second component 44 by which the ferrules 16 are located. Thus, the first component 42 includes a sheath opening 42a at one end of the ferrule carrier, and the second component 44 includes ferrule openings at the other end of the ferrule carrier. The second component 44 is arranged to butt against the end block 18 and grips a neck part 16a of the ferrules 16.

When the end block 18 is depressed into the body of the connector element 10, the two ends 42, 44 of the ferrule carrier need to displace towards each other. This displacement is against the bias of a second spring 46 which ensures that the second component 44 is maintained in the position in which it butts against the end block 18. The first and second components 42, 44 may be assembled together to form the ferrule carrier, which may be inserted into the main body 34 of the connector element 10 as a single unit. For this purpose pin and slot connections may again be provided between the first and second components 42, 44 enabling limited sliding between the two components.

To assemble the connector element, the individual optical fibers 14 are cut to the appropriate length, and the ferrules are attached at the ends. The individual fibers are fed into the ferrule carrier through the sheath opening 42a in the first component 42. The individual fibers 14 are fed along the ferrule carrier and eventually the ferrules 16 are located in the ferrule openings in the second component 44. The optical lens assemblies 17 are placed in the openings of the end block 18, and there may also be provided spacers between the lens assemblies and the ferrules. The ferrules 16 are then fed into the openings in the end block 18 during assembly of the remaining parts of the connector element 10.

FIG. 2 shows in greater detail the hermaphroditic bayonet fitting 30 which enables identical connector elements 10 to be coupled together. The fitting 30 includes two diametrically opposed connection arms 50, 52 and when two connectors 10 are coupled together, the arms 50, 52 of one connector are positioned in the gaps 54 between the arms of the other connector. The gaps 54 are provided with a latch arrangement 56 which cooperates with an engagement surface 58 of the arms 50 to provide the bayonet coupling. When the two connector elements 10 are initially brought together, the pin 32 of one enters the opening 33 of the other. During the bayonet coupling operation, the end block 18 rotates within the main body 34 and correct alignment between the ferrules of each connector element 10 is provided at all times. Thus, during connection of two connector elements 10, there is no relative rotational movement between the end faces 20 of the end blocks 18. However, a connector element 10 may also be coupled to a cover plate which simply acts as a protective covering over the connector element 10. Such a cover plate also includes an O-ring seal, but which typically is not provided in a rotatable component. Thus, when securing an end plate to the connector element 10, there will be relative rotational movement between the seals of the end plate and of the connector element 10.

To the extent described above, the connector element assembly is known, and has been manufactured by the applicant.

Referring back to FIG. 1, the invention is specifically directed to the bayonet coupling 30, and concerns an alignment feature 60 shown in FIG. 3, but not described above. This alignment feature 60 is positioned such that when the alignment feature of one connector and of another identical connector are aligned, the arms 50 of one connector are inserted into the spaces 54 between the arms of the other connector, with the correct relative positioning to enable the bayonet fitting to be established.

As shown more clearly in FIG. 3, the alignment feature 60 comprises a raised portion provided along one edge of one of the arms 50. To connect two identical connector elements 10 together, the edge faces having the alignment feature 60 are mated together. This relative positioning of the two connector elements gives the correct alignment for the pins 32 and recesses 33 to engage, so that in one simple operation two connectors can be mated together.

By positioning the alignment feature at an edge of the arms 50, they are located at a position where the thumb of the assembler naturally rests. The shape of the alignment feature 60 is preferably selected such that it can easily be felt, even through thick gloves. This also avoids the need for lighting to make a rapid correct coupling. In the example shown, the alignment feature comprises a raised arrow-head shape, so that feeling along the edge of the arm 50 in either direction will enable the identification feature to be identified (either as a drop or as a ridge). However, many suitable forms will be apparent to those skilled in the art.

The edge on which the alignment feature is located is at one angular end 54a of one of the two spacing areas 54, with the bayonet latch arrangement 56 at the other angular end 54b of the spacing. Thus, the alignment features are together before engagement of the bayonet fitting and become separated after engagement of the bayonet fitting, which is clockwise in the FIG. 2 example. Similarly, the alignment feature is one angular end of one arm 50 and the engagement surface 58 is at the other angular end of that arm.

FIG. 3 shows two identical connector elements 10 with the correct angular alignment to be brought into engagement. The bayonet latching arrangement 56 is shown in greater detail in FIG. 3. The engagement surface 58 comprises a recessed channel into which the projecting latch element 56 is received after rotation of the bayonet coupling. When the connector elements are initially brought together, the latch arrangement 56 and engagement surface 58 miss each other. In other words, the arm 50 fits in the angular end of the spacing 54a away from the latch arrangement 56.

The edge of the arm 50 on which the alignment feature 60 is provided has a smooth end surface 61 so that the two surfaces may slide past each other. Apart form this, alignment feature described above provides no assistance in bringing the two connector elements together once correctly aligned. However, the alignment feature may additionally assist in bringing the two components together, and may comprises tapered guide surfaces for this purpose. For example, a corner of the edge of the arm 50 may be removed to define an angled guide surface, so that the two connector elements 10 are automatically brought into the correct alignment before the pins and recesses 32, 33 engage, even if the initial rotational position selected by the assembler is slightly incorrect.

Of course, the alignment features may also be visually distinctive. Various modifications will be apparent to those skilled in the art.

What is claimed is:

1. An optical fiber connector element comprising a connector body which receives an optical fiber, the connector body being provided with coupling means to enable two connector elements having identical coupling means to be mated to connect optically the optical fibers, the coupling means comprising bayonet couplings having two diametrically opposed connection arms, the arms of one connector element fitting in the spacing between the arms of another connector element that has an identical coupling means, relative rotation between the one connector and the other connector then enabling a bayonet connection to be established, wherein: the connector body is provided with an alignment feature on one of said arms, said alignment feature positioned such that when the alignment feature of the one connector element and of the other connector element are aligned, the arms of the one connector element are inserted into the spaces between the arms of the other connector element with the correct relative positioning to enable the bayonet connection to be established.

2. An optical fiber connector element as claimed in claim 1, wherein the alignment feature is of a particular shape and said alignment feature of that particular shape is provided on only one of the two diametrically opposed arms.

3. An optical fiber connector as claimed in claim 2, wherein the alignment feature is provided at only one angular side of one of said arms.

4. An optical fiber connector element as claimed in claim 1, wherein the alignment feature comprises a raised portion.

5. An optical fiber one connector which has a connector body constructed to receive an optical fiber, the connector body having an axis and a bayonet coupling with a plurality of arms angularly spaced about the axis for connection to a mating connector with an identical connector body, the arms of the one connector fitting into the space between the arms of the mating connector, with subsequent rotation about the axis of the one connector with respect to the mating connector then establishing a bayonet connection, wherein:

said connector body of said one connector has a particular alignment feature lying at only a first one of said arms of said one connector so when the alignment feature of said one connector and of said mating connector are aligned then the connectors are in the correct positions to fit the arms of said one connector into the spaces of the mating connector followed by rotation to establish a correct bayonet connection.

6. The connector described in claim 5 wherein:

said alignment feature comprises a raised portion adjacent to a first side edge of said first arm, wherein said first side edge lies adjacent to a space that receives the first arm of the mating connector, whereby to encourage alignment of proper edges of the first arms of the two connectors.

7. The connector described in claim 5 wherein:

said alignment feature comprises at leak part of an arrow head that points toward the mating connector.

* * * * *